(12) United States Patent  (10) Patent No.: US 7,602,948 B2
Ito  (45) Date of Patent: Oct. 13, 2009

(54) PERSONAL AUTHENTICATION APPARATUS

(75) Inventor: Wataru Ito, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 754 days.

(21) Appl. No.: 10/761,261

(22) Filed: Jan. 22, 2004

(65) Prior Publication Data

US 2004/0151351 A1   Aug. 5, 2004

(30) Foreign Application Priority Data

Feb. 5, 2003 (JP) ............................. 2003-028774
Oct. 27, 2003 (JP) ............................. 2003-366624

(51) Int. Cl.
*G06K 9/00* (2006.01)
*G06F 7/00* (2006.01)
*G08B 23/00* (2006.01)

(52) U.S. Cl. .................. 382/118; 707/3; 340/573.1
(58) Field of Classification Search .................. 382/118
See application file for complete search history.

(56) References Cited

U.S. PATENT DOCUMENTS

| | | | | |
|---|---|---|---|---|
| 5,163,094 A | * | 11/1992 | Prokoski et al. | 382/118 |
| 5,781,650 A | * | 7/1998 | Lobo et al. | 382/118 |
| 5,802,220 A | * | 9/1998 | Black et al. | 382/276 |
| 5,850,463 A | * | 12/1998 | Horii | 382/118 |
| 5,933,527 A | * | 8/1999 | Ishikawa | 382/190 |
| 5,982,373 A | * | 11/1999 | Inman et al. | 345/419 |
| 5,991,429 A | * | 11/1999 | Coffin et al. | 382/118 |
| 6,016,148 A | * | 1/2000 | Kang et al. | 345/622 |
| 6,072,894 A | * | 6/2000 | Payne | 382/118 |
| 6,108,437 A | * | 8/2000 | Lin | 382/118 |
| 6,292,575 B1 | * | 9/2001 | Bortolussi et al. | 382/118 |
| 6,335,688 B1 | * | 1/2002 | Sweatte | 340/573.1 |
| 6,430,306 B2 | * | 8/2002 | Slocum et al. | 382/118 |
| 6,628,811 B1 | * | 9/2003 | Nagao et al. | 382/18 |

(Continued)

FOREIGN PATENT DOCUMENTS

JP      4-76690 A     3/1992

(Continued)

OTHER PUBLICATIONS

At the Airport, Immigration Wants to See Your Palm, New York Times, Frank J. Prial, Sep. 17, 1993.*

*Primary Examiner*—Bhavesh M Mehta
*Assistant Examiner*—David P Rashid
(74) *Attorney, Agent, or Firm*—Birch, Stewart, Kolasch & Birch, LLP

(57) ABSTRACT

A personal authentication apparatus inquires into a face-picture of a suspected person as well as a face-picture of a person himself. A personal authentication apparatus for certifying that a user is a person himself comprises an image pickup unit for taking a face-picture of the user, a particular person comparing unit for comparing the user's face-picture taken by the image pickup unit with a face-picture of a particular person held in advance, a personal picture acquiring unit for acquiring the face-picture of the person himself from a memory, and an authentication unit for deciding whether or not the user's face-picture taken by the image pickup unit is identical with the face-picture of the person himself acquired by the personal picture acquiring unit by a different method based upon the comparison result by the particular person comparing unit.

20 Claims, 8 Drawing Sheets

U.S. PATENT DOCUMENTS

| | | | | |
|---|---|---|---|---|
| 2001/0016820 A1* | 8/2001 | Tanaka et al. | ................... | 705/1 |
| 2002/0113862 A1* | 8/2002 | Center et al. | ............. | 348/14.08 |
| 2002/0126880 A1* | 9/2002 | Dobashi | ..................... | 382/118 |
| 2002/0167403 A1* | 11/2002 | Colmenarez et al. | ........ | 340/541 |
| 2002/0176610 A1* | 11/2002 | Okazaki et al. | ............. | 382/118 |
| 2003/0126121 A1* | 7/2003 | Khan et al. | .................... | 707/3 |
| 2003/0215114 A1* | 11/2003 | Kyle | ......................... | 382/115 |

FOREIGN PATENT DOCUMENTS

| | | |
|---|---|---|
| JP | 6-295332 A | 10/1994 |
| JP | 2000-331209 A | 11/2000 |
| JP | 2001-326841 A | 11/2001 |
| JP | 2001-331799 A | 11/2001 |
| JP | 2002-92495 A | 3/2002 |
| JP | 2002-245560 A | 8/2002 |
| JP | 2002-342862 A | 11/2002 |

* cited by examiner

120

| ID OF DANGEROUS PERSON | FACE PICTURE | DEGREE OF COINCIDENCE (%) |
|---|---|---|
| 0 0 1 | 001. bmp | x x |
| 0 0 2 | 002. bmp | x x |
| ⋮ | ⋮ | ⋮ |

*FIG. 3*

| PERSONAL IDENTIFICATION INFORMATION | 001 | TEMPLATE FACE PICTURE | 001.bmp | | |
|---|---|---|---|---|---|
| AUTHENTICATION PLACE | AUTHENTICATION DATE, TIME | ID OF DANGEROUS PERSON HAVING RESEMBLANCE | DEGREE OF COINCIDENCE | FACE PICTURE OF PERSON HIMSELF | |
| NARITA | 2002.5.19 13:15 | 001 | x x | 001_01.bmp | |
| HANEDA | 2002.5.19 17:20 | 001 | x x | 001_02.bmp | |
| ... | ... | ... | ... | ... | |

PERSONAL AUTHENTICATION APPARATUS

This patent application claims priorities from Japanese patent applications Nos. 2003-028774 filed on Feb. 5, 2003 and 2003-366624 filed on Oct. 27, 2003, the contents of which are incorporated herein by reference.

BACKGROUND OF THE INVENTION

1. Field of the Invention

The present invention relates to a personal authentication apparatus. More particularly, the present invention relates to the personal authentication apparatus using for a personal authentication whether or not a user is similar to a particular person such as a suspected person.

2. Description of the Related Art

In order to manage entrance management or immigration management, a personal authentication may be performed. An implementation of the personal authentication includes a method of using portable recording media holding an authentication key and a method of using a face-picture (or a head shot) and/or a fingerprint etc. For details, refer to, for example, Japanese Patent Application Publication (Laid-Open) Nos. 2002-92495 and 2001-326841.

When a user performs the personal authentication using the face-picture, a suspected person, for example, a wanted man may behave like someone else who has a resemblance to the wanted man himself. For this reason, the prior method may also fail to catch the suspected person who has behaved like someone else when certifying the person himself using the only face-picture of the person himself. For this reason, in the case of certifying the person himself, it is preferable to collate the face-picture of the suspected person as well as the face-picture of the person himself with the face-picture of the user.

SUMMARY OF THE INVENTION

Therefore, it is an object of the present invention to provide a personal authentication apparatus which can solve the foregoing problems. The above and other objects can be achieved by combinations described in the independent claims. The dependent claims define further advantageous and exemplary combinations of the present invention.

According to the first aspect of the present invention, there is provided a personal authentication apparatus for certifying that a user is a person himself. The personal authentication apparatus comprises an image pickup unit for taking a face-picture or a head shot of the user, a particular person comparing unit for comparing the user's face-picture taken by the image pickup unit with a face-picture of a particular person held in advance, a personal picture acquiring unit for acquiring the face-picture of the person himself from a memory, and an authentication unit for deciding whether or not the user's face-picture taken by the image pickup unit is identical with the face-picture of the person himself acquired by the personal picture acquiring unit by a different method based upon the comparison result by the particular person comparing unit.

In the personal authentication apparatus, the face-picture of the particular person may be a face-picture of a suspected person, the particular person comparing unit may decide whether or not the user's face-picture is similar to the face-picture of the suspected person and outputs the decision result as the comparison result, when the particular person comparing unit decides that the user's face-picture is similar to the face-picture of the suspected person, the authentication unit may decide whether or not the user's face-picture is identical with the face-picture of the person himself with more strict reference.

In the personal authentication apparatus, when the particular person comparing unit decides that the user's face-picture is similar to the face-picture of the suspected person, the image pickup unit may heighten resolution or gradation, and take the user's face-picture again, the authentication unit may decide whether or not the user's face-picture having the enhanced resolution or gradation is identical with the face-picture of the person himself in order to decide with more strict reference. The authentication unit may increase the number of the features that are extracted from each of the user's face-picture and the face-picture of the person himself in order to decide with more strict reference.

In the personal authentication apparatus, the authentication unit may further acquire new features of appearance of the person himself to decide with more strict reference, and decide whether or not the user's face-picture is identical with the face-picture of the person himself using the newly acquired features. The image pickup unit may take the user's face-pictures as an animated image, the personal picture acquiring unit may acquire the animated image of the face-pictures of the person himself from the memory, the authentication unit may decide whether or not the user's face-picture is identical with the face-picture of the person himself by comparing a plurality of frames in the animated image of the user's face-pictures and a plurality of frames in the animated image of the face-pictures of the person himself to decide with more strict reference.

In the personal authentication apparatus, the authentication unit may change the type of the features that are extracted from each of the user's face-picture and the face-picture of the person himself based upon the comparison result by the particular person comparing unit. When the particular person comparing unit decides that the user's face-picture is similar to the face-picture of the suspected person, the image pickup unit takes the user's face-picture by irradiating an invisible light to the user, the authentication unit may decide whether or not the user's face-picture is identical with the face-picture of the person himself using the user's face-picture taken by irradiation of the invisible light to decide with more strict reference.

In the personal authentication apparatus, the personal authentication apparatus may certify that a plurality of users is the person himself respectively, the particular person comparing unit may compare the user's face-picture taken by the image pickup unit with the face-pictures of a plurality of the particular persons, the personal authentication apparatus further comprises a log holding unit for holding authentication times of the plurality of the persons himself and the particular persons having a resemblance in response to the person himself, the authentication unit may decide a decision method of whether or not the user is the person himself using another authentication history of the person himself held in the log holding unit.

In the personal authentication apparatus, each of the plurality of particular persons may be the suspected person, when deciding that the face-pictures of the plural other persons himself are similar to the face-pictures of the plural suspected persons respectively within a predetermined time, the authentication unit may decide whether or not the user's face-picture is identical with the face-picture of the person himself with more strict reference. When the particular person comparing unit decides that the user's face-picture is similar to the face-picture of the suspected person, the authentication unit may transmit the user's face-picture to a person deciding apparatus installed in other places than that of the personal authentication apparatus for deciding whether or not the user is the person himself.

In the personal authentication apparatus, the image pickup unit may include a first image pickup unit and a second image pickup unit, the particular person comparing unit may compare the user's face-picture taken by the first image pickup unit with the face-picture of the particular person, when the particular person comparing unit decides that the user's face-picture is not similar to the face-picture of the suspected person, the authentication unit may decide whether or not the user's face-picture taken by the first image pickup unit is identical with the face-picture of the person himself, when the particular person comparing unit decides that the user's face-picture is similar to the face-picture of the suspected person, the authentication unit may decide whether or not the user's face-picture taken by the second image pickup unit is identical with the face-picture of the person himself. The second image pickup unit may generate the face-picture having more amount of information than that of the face-picture taken by the first image pickup unit.

In the personal authentication apparatus, when the particular person comparing unit decides that the user's face-picture is similar to the face-picture of the suspected person, the authentication unit may acquire the user's face-picture from other personal authentication apparatus provided on a path through which the user passes, and decide whether or not the user's face-picture taken by the image pickup unit is identical with the face-picture of the person himself using that face-picture.

The summary of the invention does not necessarily describe all necessary features of the present invention. The present invention may also be a sub-combination of the features described above.

BRIEF DESCRIPTION OF THE DRAWINGS

FIG. 3 is a table showing data configuration of a particular person information holding unit.

FIG. 4 is a table showing data configuration of a memory.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
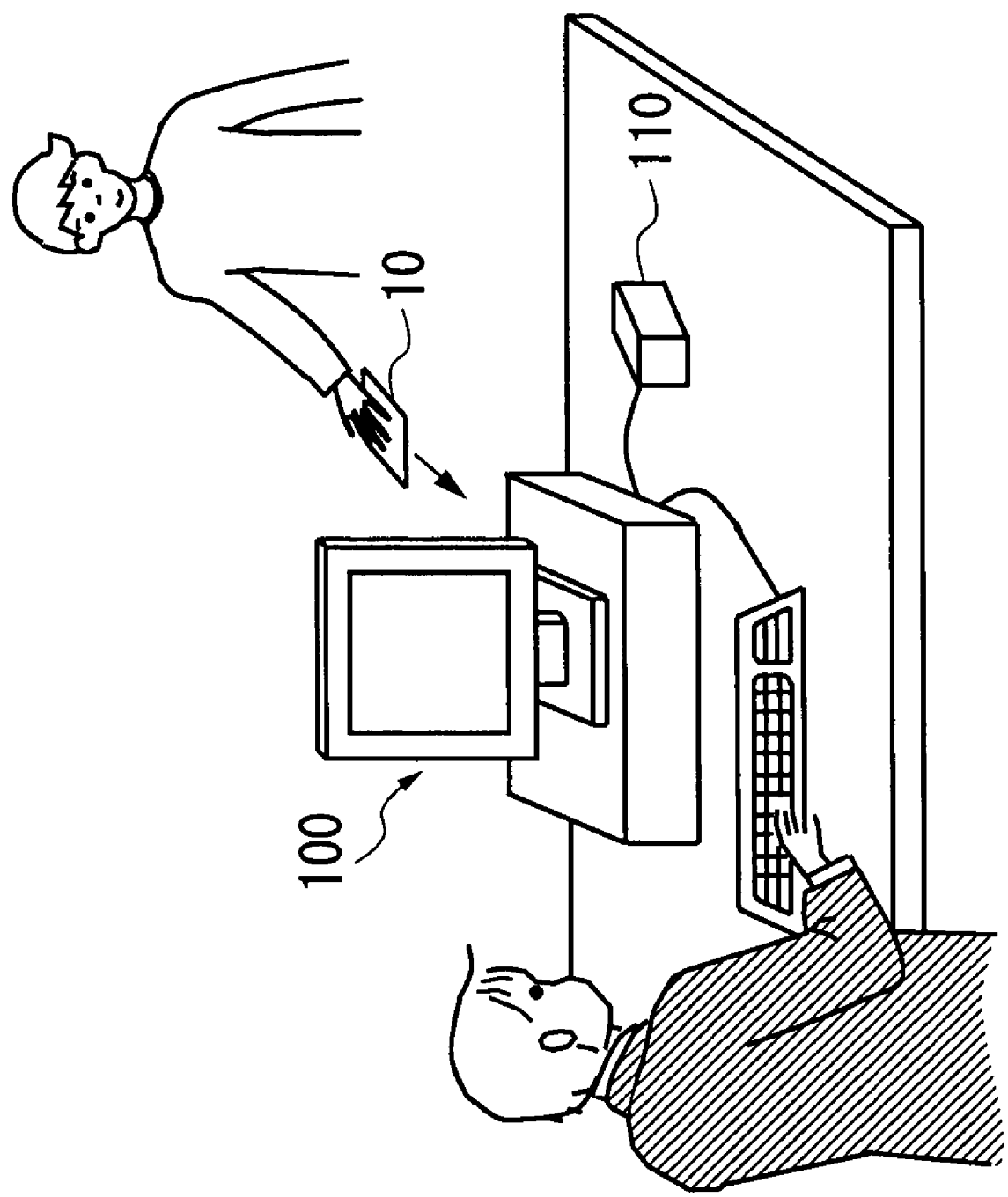
FIG. 1 is a view showing a use example of a personal authentication apparatus according to an embodiment of the present invention.

FIG. 1 is a view showing a use example of a personal authentication apparatus 100 according to an embodiment of the present invention. The personal authentication apparatus 100 is installed in plural places respectively. The plural personal authentication apparatuses 100 share an authentication history. In addition, the personal authentication apparatus 100 holds a template face-picture of a person himself and a face-picture or a head shot of a suspected person in advance.

The personal authentication apparatus 100 acquires a personal identification information such as ID from an IC card 10 of the person himself who should be certified, and selects the template face-picture of the person himself using the personal identification information. In addition, the personal authentication apparatus 100 takes a face-picture of a use to be certified as the person himself using an image pickup unit 110. The personal authentication apparatus 100 certifies the person himself under a strict judgment standard when it was determined that degree of coincidence of the user's face-picture taken by the image pickup unit 110 and the suspected person's face-picture is more than a reference value, and thus they resemble each other. After that, the personal authentication apparatus 100 performs an authentication process by comparing the user's face-picture taken by the image pickup unit 110 with the template face-picture of the person himself.

As mentioned above, when it was determined that the user has a resemblance to the suspected person, the personal authentication apparatus 100 decides whether or not the user is the person himself under a strict judgment standard. Therefore, even if the suspected person behaves like someone else, and the possibility that the suspected person is certified as someone else is low.

Figure 2:
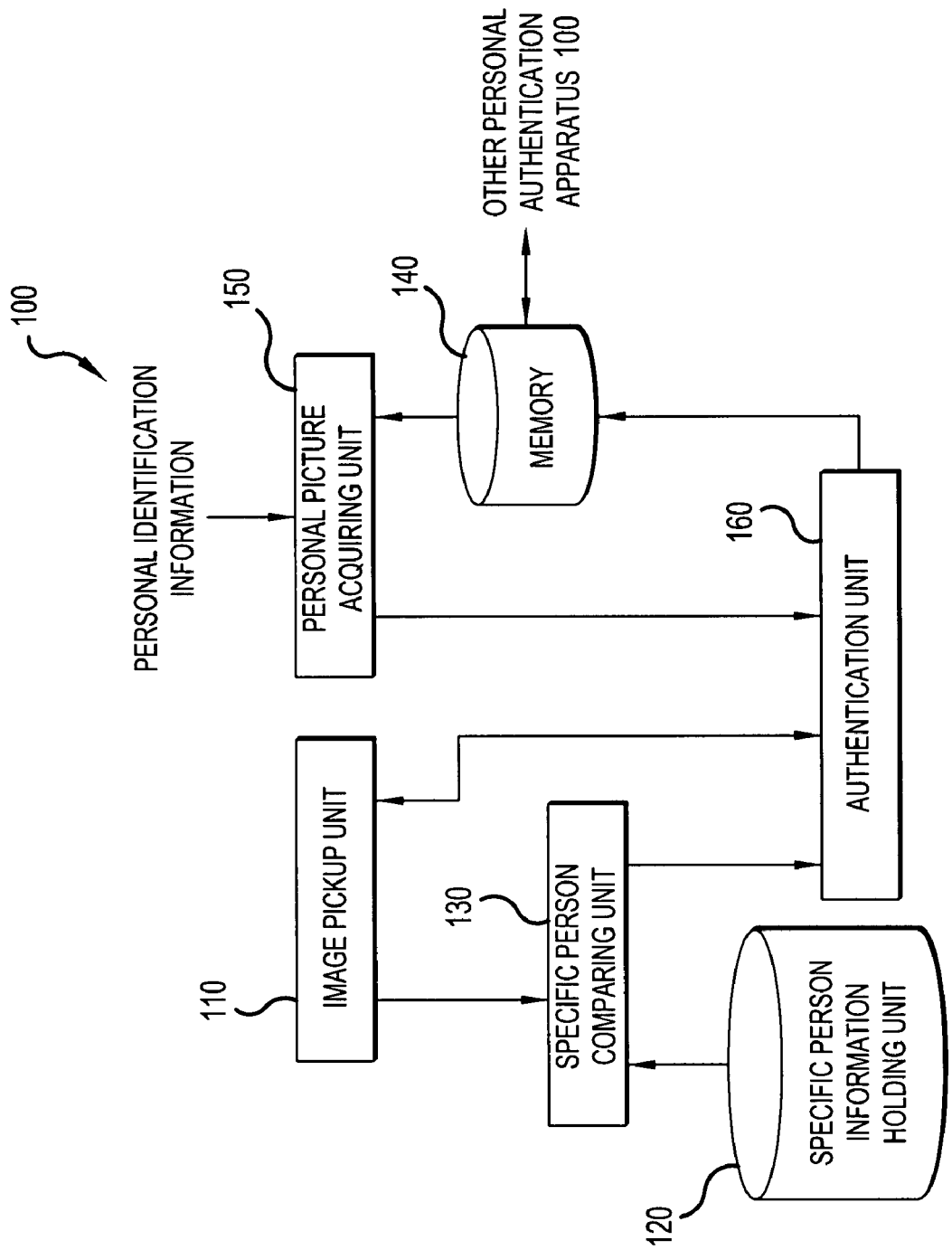
FIG. 2 is a block diagram showing a configuration of the personal authentication apparatus.

FIG. 2 is a block diagram showing a configuration of the personal authentication apparatus 100. The personal authentication apparatus 100 comprises the image pickup unit 110, a particular person information holding unit 120, a particular person comparing unit 130, a memory 140, a personal picture acquiring unit 150, and an authentication unit 160. The memory 140 is an example of a log holding unit.

The particular person information holding unit 120 holds a face-picture of a suspected person. The particular person comparing unit 130 calculates degree of coincidence of the user's face-picture taken by the image pickup unit 110 and the suspected person's face-picture held by the particular person information holding unit 120, and decides whether or not these face-pictures resemble each other. As the comparison result, the particular person comparing unit 130 outputs the decided result of whether or not the user's face-picture and the suspected person's face-picture resemble each other. The memory 140 holds the template face-picture and the authentication history of the person himself corresponding to the personal identification information. In addition, the memory 140 communicates with different personal authentication apparatuses 100 to share the authentication history. The personal picture acquiring unit 150 acquires the template face-picture and the authentication history of the person himself from the memory 140 based upon the personal identification information acquired from the IC card 10. The authentication unit 160 sets a judgment standard for the personal authentication based upon the comparison result from the particular person comparing unit 130. For example, when the particular person comparing unit 130 has decided that the user's face-picture and the suspected person's face-picture resemble each other, the authentication unit 160 decides under a strict judgment standard whether the user's face-picture is identical with the personal face-picture. By this, the authentication unit 160 performs the personal authentication process based upon the set judgment standard, the user's face-picture generated by the image pickup unit 110, the template picture of the person himself acquired by the personal picture acquiring unit 150, and the authentication history of the person himself.

Furthermore, a detailed configuration of data held by the particular person information holding unit 120 and the memory 140 will be explained below using a table. In addition, the details of an operation of the authentication unit 160 will be described below using a flowchart.

Moreover, the suspected person according to this example is an example of a particular person. In other examples, the particular person information holding unit 120 may also hold, for example, a face-picture of an important person such as a customer etc. as the face-picture of the particular person. In this case, the particular person comparing unit 130 decides whether the user's face-picture is similar to the face-picture of the important person. The authentication unit 160 changes a judgment method for authentication depending on the comparison result by the particular person comparing unit 130. Similarly, it can be prevented that someone else behaves like the important person. Thereby, they can be serviced by a proper and quick recognition of the important person such as customer etc.

FIG. 3 is a table showing data configuration of the particular person in formation holding unit 120. The particular person information holding unit 120 holds the face-pictures of the suspected persons and degrees of coincidence of pictures necessary to decide that the user is similar to one of the suspected persons in response to IDs of the suspected persons. The degrees of coincidence are set low for the suspected persons who should particularly be heeded, and are set high for the suspected persons who should not particularly be heeded.

Thereby, the number of those who are similar to the suspected persons who should not particularly be heeded is reduced. Accordingly, the change frequency of the judgment standard by the personal authentication apparatus 100 is reduced.

FIG. 4 is a table showing data configuration of the memory 140. The memory 140 holds the template face-pictures and authentication histories of the persons themselves in response to the personal identification information. The memory 140 stores correspondingly, as the authentication histories of the persons themselves, authentication places in which the face-pictures of the person himself are taken, authentication dates and times on which the face-pictures of the person himself are taken, Ids of the suspected persons having resemblance, degrees of coincidence of the face-pictures of the person himself taken in authentication process and the face-pictures of the suspected persons, and the face-pictures of the person himself taken in authentication process.

Thereby, the personal authentication apparatus 100 can recognize when and where the person himself has been certified. In addition, the personal authentication apparatus 100 can recognize that the person himself is similar to a certain suspected person.

Figure 5:
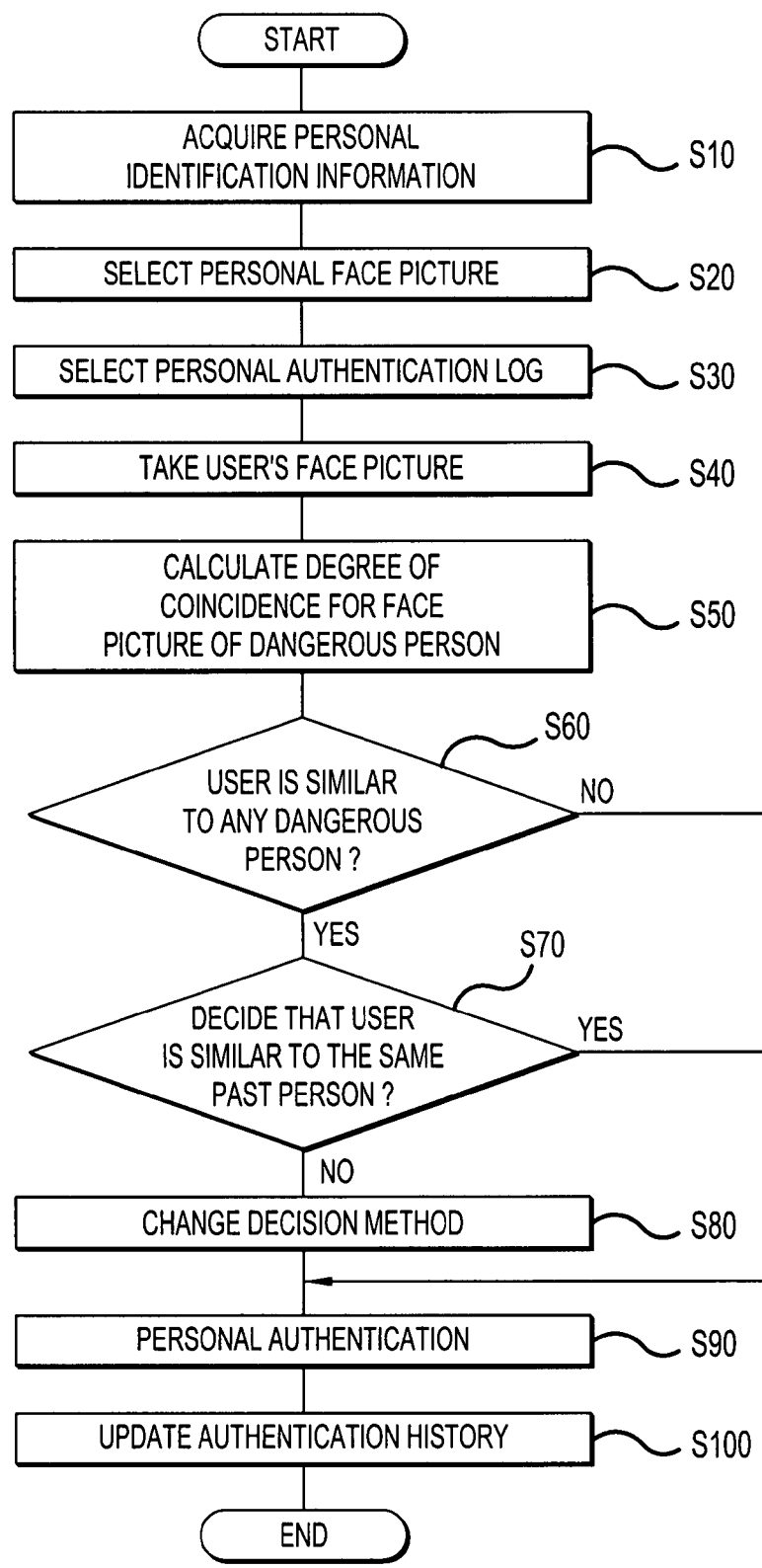
FIG. 5 is a flowchart showing an operation of the personal authentication apparatus.

FIG. 5 is a flowchart showing an operation of the personal authentication apparatus 100. The personal picture acquiring unit 150 of the personal authentication apparatus 100 acquires the personal identification information from the IC card of the person himself (S10). Then, the personal picture acquiring unit 150 selects the face-picture and the authentication history (authentication log) of the person himself from the memory 140 (S20 and S30).

The image pickup unit 110 takes a face-picture of the user who should be certified as the person himself (S40). The particular person comparing unit 130 calculates degrees of coincidence between the face-picture of the user and all the face-pictures of the suspected persons held by the particular person information holding unit 120 (S50).

When the degree of coincidence calculated for a certain suspected person is greater than the degree of coincidence for each suspected person held by the particular person information holding unit 120, the particular person comparing unit 130 decides that the user is similar to that suspected person (S60: Yes). In this case, the authentication unit 160 inquires into an authentication history of the person himself. Then, when it is decided that the user has been similar to the same suspected person before (S70: Yes), the apparatus recognizes that the person himself is originally similar to the particular suspected person and normally performs the personal authentication.

In addition, when it is decided that the user is similar to the new suspected person (S70: No), the authentication unit 160 decides that the possibility to be behaved like the person himself by the suspected person is high, and certifies the person himself under the strict judgment standard (S80). For example, the authentication unit 160 increases the degree of coincidence necessary to the personal authentication.

When changing the judgment standard in S80, the authentication unit 160 performs the personal authentication according to the changed judgment standard. Otherwise, the authentication unit 160 performs the personal authentication according to the normal judgment standard (S90).

Then, the authentication unit 160 stores the authentication place, the authentication time, the ID of the similar suspected person, the degree coincidence, and the user's face-picture in the memory 140 in response to the person himself, and updates the authentication history (S100). Thereby, the authentication history of the different personal authentication apparatuses 100 is also updated.

Here, when changing the judgment standard in S80, the authentication unit 160 may allow the image pickup unit 110 to take the user's face-picture once more with higher resolution than usual resolution. In this case, the authentication unit 160 uses the user's face-picture with higher resolution for certifying the person himself.

Furthermore, the authentication unit 160 may also increase more than usual the number of the features that are extracted from the face-picture of the user and the face-picture of the person himself respectively. To be more precise, in the features that are extracted from both the face-pictures, for example, the distance between the eyes and the counter of the face are altered to the distance between the eyes, the counter of the face and the shapes of parts of the face such as an eye and a nose by the authentication unit 160. The authentication unit 160 may also change the type of the features that are extracted from the face-picture of the user and the face-picture of the person himself respectively based upon the comparison results by the particular person comparing unit 130.

In addition, in another example, the authentication unit 160 may also utilize a face-picture taken for past authentication to certify the user with more strict reference. For example, when the particular person comparing unit 130 decides that the user's face-picture is similar to the face-picture of the suspected person, the authentication unit 160 acquires the user's face-picture from the other personal authentication apparatus 100. The other personal authentication apparatus 100, for example, is provided on a path through which the user passes. Then, the authentication unit 160 decides whether or not the user's face-picture taken by the image pickup unit 110 is identical with the face-picture of the person himself using the face-picture acquired from the other personal authentication apparatus 100. In this case, for example, even if the user behaves like someone else by disguising himself in course of the path, the possibility that the user is misunderstood as someone else is not reduced. Moreover, the authentication unit 160 may also utilize the face-picture taken by the same personal authentication apparatus 100 during the past authentication in order to decide with more strict reference.

Moreover, in further another example, when the user's face-picture is similar to the face-picture of the suspected person, the authentication unit 160 may also inform an attendant of the result, for example, by sounding an alarm. In this case, the authentication is performed by a particular method, for example, that the attendant directly confirms the person himself. Thereby, the authentication unit 160 changes the decision method of the personal authentication into the confirmation of the attendant.

Figure 6:
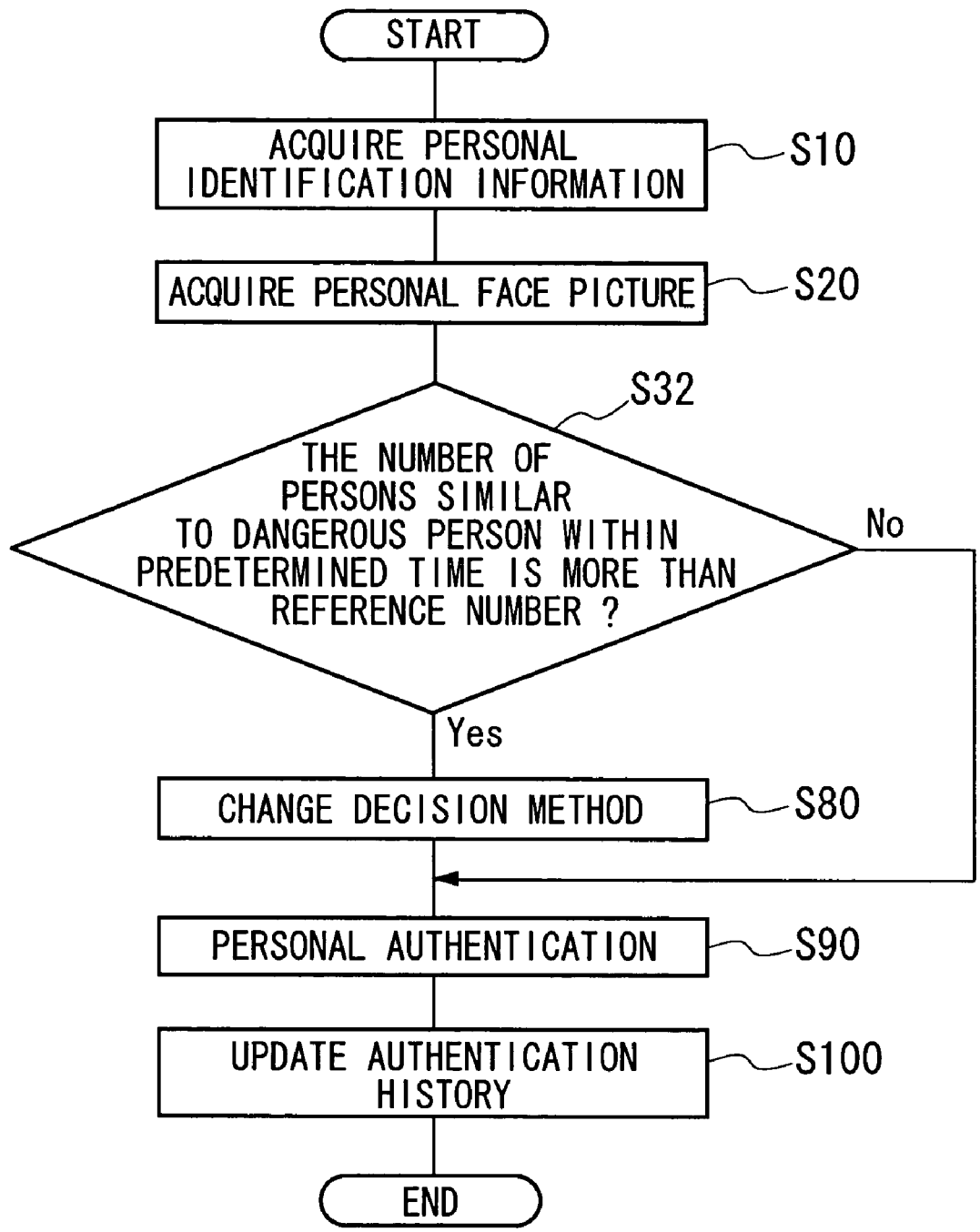
FIG. 6 is a flowchart showing a transformation example of an operation of the personal authentication apparatus.

FIG. 6 is a flowchart showing a transformation example of an operation of the personal authentication apparatus 100. In this transformation example, the personal authentication apparatus 100 decides a decision method of the personal authentication using an authentication history of another person included in the authentication history. In this transformation example, the explanation for operations of S10 and S20 is omitted because the operations are identical to those shown in FIG. 5.

The personal picture acquiring unit 150 acquires the number of persons who are similar to the suspected person from the present to the predetermined time using an authentication log held in the memory 140. Then, if the number is more than the reference number (S32: Yes), the apparatus decides there is a possibility that the plurality of suspected persons behaves as a group, and certifies the person himself with a strict decision method (S80). The detailed explanation for the decision method is omitted because it is identical to the method of S80 shown in FIG. 5.

After that, the apparatus certifies the person himself (S90), and updates the authentication history in the memory 140 (S100). The operations of S90 and S100 are identical to those in FIG. 5.

Figure 7:
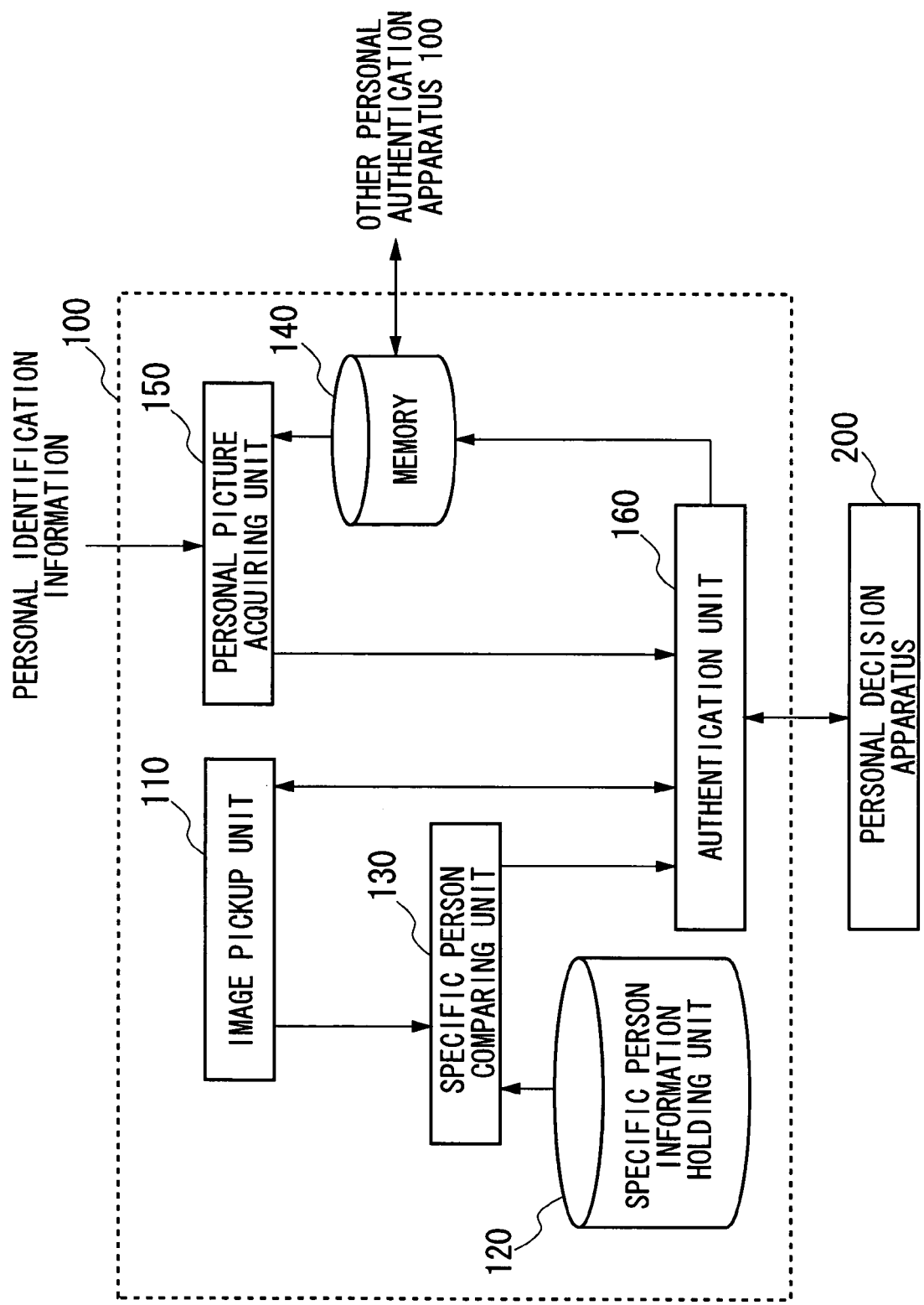
FIG. 7 is a block diagram showing a transformation example of a configuration of the personal authentication apparatus.

FIG. 7 is a block diagram showing a transformation example of a configuration of the personal authentication apparatus 100. In FIG. 7, except for the following explanations, the explanation for the constitutions having the same reference numbers as those in FIG. 2 is omitted because the constitutions have the same or similar functions to the constitutions in FIG. 2. In this transformation example, the personal authentication apparatus 100 communicates with a personal decision apparatus 200. The personal decision apparatus 200 is provided in a different place from the establishment place of the personal authentication apparatus 100, such as in a separate room or a security firm, for deciding whether or not the user is the person himself.

When the particular person comparing unit 130 decides that the user's face-picture is similar to the face-picture of the suspected person, the authentication unit 160 transmits the user's face-picture to the personal decision apparatus 200. Furthermore, the authentication unit 160 also transmits the face-picture of the person himself acquired from the personal picture acquiring unit 150 to the personal decision apparatus 200. The personal decision apparatus 200 decides whether or not the user's face-picture acquired from authentication unit 160 is identical with the user's face-picture, and transmits the decision result to the authentication unit 160.

Here, the personal decision apparatus 200 has higher function than that of the personal authentication apparatus 100, for example, from the viewpoint of hardware. In this case, the personal decision apparatus 200 can decide with high precision whether or not both pictures are the pictures of the same person by analyzing the user's face-picture and the face of the person himself in more detail. For this reason, in this example, the authentication unit 160 can decide whether the user is the person himself with more strict reference when the user's face-picture is identical with the face-picture of the suspected person.

In addition, the personal decision apparatus 200 may also display the user's face-picture and the face-picture of the person himself on a display device. The personal decision apparatus 200 acquires the decision result from the user, and transmits it to the authentication unit 160. Similarly, in this case, the authentication unit 160 can decide whether or not both pictures are the pictures of the same person with high precision.

Figure 8:
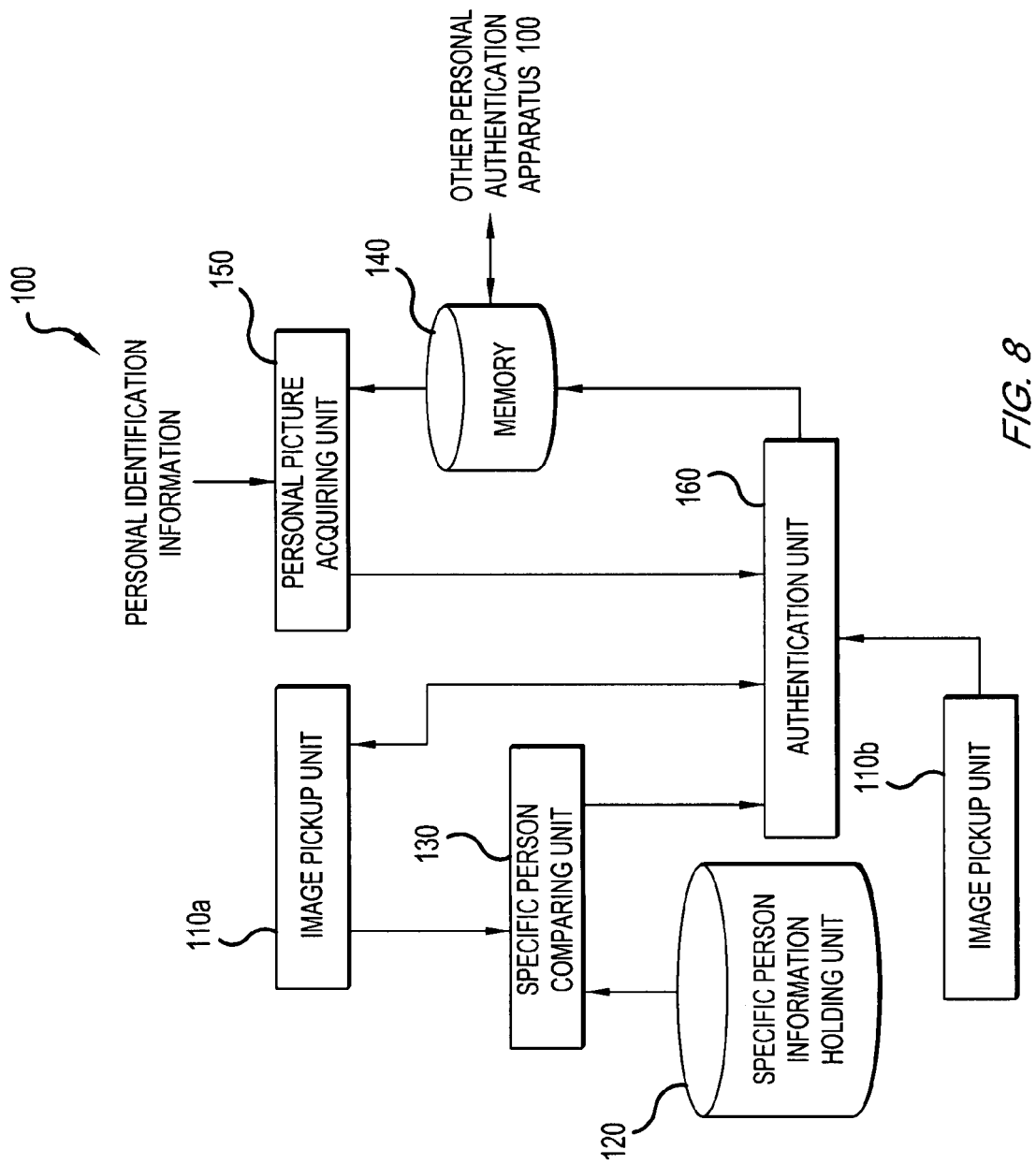
FIG. 8 is a block diagram showing a further transformation example of a configuration of the personal authentication apparatus.

FIG. 8 is a block diagram showing a further transformation example of a configuration of the personal authentication apparatus 100. Furthermore, in FIG. 8, except for the following explanations, the explanation for the constitutions having the same reference numbers as those in FIG. 2 is omitted because the constitutions have the same or similar functions to the constitutions in FIG. 2. In this transformation example, the personal authentication apparatus 100 includes a plurality of image pickup units 110a and 110b.

The personal authentication apparatus 100, at first, lets the image pickup unit 110a to take the user's face-picture. The image pickup unit 110a takes the user's face-picture to compare it with the face-picture of the suspected person, and supplies the taken picture to the particular person comparing unit 130. The particular person comparing unit 130 compares the user's face-picture taken by the image pickup unit 110a with the face-picture of the suspected person. Then, when the particular person comparing unit 130 decides that the user's face-picture is similar to the face-picture of the suspected person, the authentication unit 160 lets the image pickup unit 110b to take the user's face-picture again.

In this case, it is preferable that the image pickup unit 110b generates the face-picture having more amount of information than that of the face-picture taken by the image pickup unit 110a. For example, the image pickup unit 110b heightens resolution and gradation, and takes the user's face-picture again.

When the particular person comparing unit 130 decides that the user's face-picture is not similar to the face-picture of the suspected person, the authentication unit 160 decides whether or not the user's face-picture taken by the image pickup unit 110a is identical with the face-picture of the person himself. Furthermore, when the particular person comparing unit 130 decides that the user's face-picture is similar to the face-picture of the suspected person, the authentication unit 160 decides whether or not the user's face-picture taken by the image pickup unit 110b is identical with the face-picture of the person himself. In this case, the authentication unit 160 decides whether or not the user's face-picture having the enhanced resolution and gradation is identical with the face-picture of the person himself. Thus, the user can be certified with more strict reference.

Here, if the authentication is usually performed using the face-picture having plenty of information, the time necessary to authentication may be increased and the authentication may be performed with low efficiency. However, in this transformation example, the authentication unit 160 normally certifies the user using the face-picture having small quantity of information. Then, the authentication unit 160 changes the decision method for authentication when the user's face-picture is similar to the face-picture of the suspected person, and certifies the user using the face-picture having plenty of information. For this reason, according to this transformation example, the authentication can be performed with high precision and efficiency.

In addition, the image pickup unit 110b may also take the user's face-picture by an animated image. In this case, the personal picture acquiring unit 150 acquires the animated image of the face-pictures of the person himself from the memory 140. The authentication unit 160 decides whether or not the user's face-picture is identical with the face-picture of the person himself by comparing, for example, a plurality of frames in the animated image of the user's face-pictures and a plurality of frames in the animated image of the face-pictures of the person himself to decide with more strict reference. Furthermore, when the image pickup unit 110a also takes the user's face-picture by an animated image, it is preferable that the image pickup unit 110b generates an animated image having high frame rate also using the animated image taken by the image pickup unit 110a.

Furthermore, the image pickup unit 110b may also take the user's face-picture by irradiating, for example, an invisible light such as an infrared light to the user. The authentication unit 160 decides whether or not the user's face-picture is identical with the face-picture of the person himself using the user's face-picture taken by irradiation of the invisible light to decide with more strict reference. In this case, the decision can be performed with more strict reference by utilizing features newly acquired by irradiation of the invisible light, such as temperature distribution acquired by detection of infrared light intensity. Moreover, thereby, the user's disguise can be penetrated.

In addition, the authentication unit 160 may further acquire new features of the person himself to decide with more strict reference. In this case, the image pickup unit 110b, for example, newly takes picture of the user's whole body. In this case, the authentication unit 160 acquires the new features such as, for example, a baggage carried by the user or the user's physique from the picture of the user's whole body. The authentication unit 160 may also detect new features such as, for example, an action of the user or a gesture made by the user from the newly taken animated image. Then, the authentication unit 160 decides whether or not the user's face-picture is identical with the face-picture of the person himself using the newly acquired features. For example, the authentication unit 160 certifies the user based upon correspondence of the user and the baggage.

Moreover, the authentication unit 160 may compare a baggage having high portability by the user and a baggage really carried by the user using the past authentication history acquired from the other personal authentication apparatus 100. Similarly, the apparatus can decide whether or not the user's face-picture is identical with the face-picture of the person himself with more strict reference.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

What is claimed is:

1. A personal authentication apparatus for certifying a user, comprising:
   a memory storing a template face-picture of the user therein, and a face-picture of a particular person who is categorized as of a special concern;
   an image pickup unit taking a face-picture of said user;
   a particular person comparing unit comparing said user's face-picture taken by said image pickup unit with the face-picture of the particular person, who is categorized as of the special concern, outputting as comparison result a degree of similarity therebetween, and deciding whether said degree of similarity is higher than a predetermined value;
   a personal picture acquiring unit for acquiring the template face-picture of the user from said memory; and
   an authentication unit,
      when said degree of similarity is higher than said predetermined value, deciding whether or not said user's face-picture taken by the image pick-up unit is identical with the template face-picture of the user by a first method, and
      when said degree to similarity is lower than said predetermined value, deciding whether or not said user's face-picture taken by the image pick-up unit is identical with the template face picture of the user by a second method, the second method being different from the first method.

2. The personal authentication apparatus as claimed in claim 1, wherein when said particular person comparing unit decides that said degree of similarity is higher than a predetermined value, said image pickup unit heightens resolution or gradation, and takes the user's face-picture again,
   said authentication unit decides whether or not said user's face-picture having the enhanced resolution or gradation is identical with the template face-picture of the user.

3. The personal authentication apparatus as claimed in claim 2, wherein when said degree of similarity is higher than said predetermined value, said image pickup unit takes said user's face-picture by irradiating an invisible light to said user,
   said authentication unit decides whether or not said user's face-picture taken by the image pick-up unit is identical with the template face-picture of the user using said user's face-picture taken by irradiation of the invisible light.

4. The personal authentication apparatus as claimed in claim 1, wherein when said degree of similarity is higher than said predetermined value, said authentication unit increases the number of the features that are extracted from each of said user's face-picture taken by the image pick-up unit and the template face-picture of the user.

5. The personal authentication apparatus as claimed in claim 1, wherein when said degree of similarity is higher than said predetermined value, said authentication unit further acquires new features of appearance of the user, and decides whether or not said user's face-picture taken by the image pick-up unit is identical with the template face-picture of the user using said newly acquired features.

6. The personal authentication apparatus as claimed in claim 5, wherein said newly acquired features comprises features included in a whole body picture of said user.

7. The personal authentication apparatus as claimed in claim 1, wherein said image pickup unit takes said user's face-picture as an animated image,
   said personal picture acquiring unit acquires the animated image of the template face-picture of the user from said memory,
   when said degree of similarity is higher than said predetermined value, said authentication unit decides whether or not said user's face-picture taken by the image pick-up unit is identical with the template face-picture of the user by comparing a plurality of frames in the animated image of said user's face-picture taken by the image pick-up unit with a plurality of frames in the animated image of the template face-picture of the user.

8. The personal authentication apparatus as claimed in claim 1, wherein when said degree of similarity is higher than said predetermined value, said authentication unit changes the type of the features that are extracted from each of said user's face-pictures and the template face-picture of the user.

9. The personal authentication apparatus as claimed in claim 1, wherein said personal authentication apparatus certifies that a plurality of users are the user respectively, said particular person comparing unit compares said user's face-picture taken by said image pickup unit with face-pictures of a plurality of said particular persons stored in memory, further comprising a log storing unit for storing information of when the certification for each of said users is performed and whether or not said degree of similarity is higher than a predetermined value, the information being associated with the user, said authentication unit decides what standard should be used for deciding whether or not said users are the user using said information stored in said log storing unit.

10. The personal authentication apparatus as claimed in claim 9, wherein each of said plurality of particular persons is the person of special concern, when said degree of similarity is higher than said predetermined value at plural times within a predetermined time, said authentication unit decides whether or not said user's face-picture taken by the image pick-up unit is identical with the template face-picture of the user by a standard stricter than the standard used therebefore.

11. The personal authentication apparatus as claimed in claim 1, further comprising a person deciding apparatus installed in a place other than that of said personal authentication apparatus, deciding whether or not said user is certified, wherein when said degree of similarity is higher than said predetermined value, said authentication unit transmits said user's face-picture taken by the image pick-up apparatus to said person deciding apparatus.

12. The personal authentication apparatus as claimed in claim 1, wherein said image pickup unit includes a first image pickup unit and a second image pickup unit, said particular person comparing unit compares said user's face-picture taken by said first image pickup unit with the face-picture of said particular person, when said degree of similarity is not higher than said predetermined value, said authentication unit decides whether or not said user's face-picture taken by said first image pickup unit is identical with the template face-picture of the user, when said degree of similarity is higher than said predetermined value, said authentication unit decides whether or not said user's face-picture taken by said second image pickup unit is identical with the template face-picture of the user.

13. The personal authentication apparatus as claimed in claim 12, wherein said second image pickup unit generates a face-picture having more amount of information than that of the face-picture taken by said first image pickup unit.

14. The personal authentication apparatus as claimed in claim 1, wherein said personal authentication apparatus is coupled to another personal authentication apparatus that is provided separately along the path through which said user passes, and wherein when said degree of similarity is decided higher than a predetermined value, said authentication unit acquires said user's face-picture from said another personal authentication apparatus, and decides whether or not said user's face-picture taken by said image pickup unit is identical with the template face-picture of the user using said user's face-picture acquired by said another personal authentication apparatus.

15. The personal authentication apparatus as claimed in claim 14, wherein said user's face-picture acquired from said another personal authentication unit comprises a face-picture taken before said user has passed through the path.

16. The personal authentication apparatus as claimed in claim 1, wherein the personal picture acquiring unit acquires the face-picture of the user from said memory based on personal identification information of the user.

17. The personal authentication apparatus as claimed in claim 16, wherein the personal identification information of the user is acquired from an IC card of the user.

18. The apparatus of claim 1, wherein the first method is stricter than the second method.

19. A personal authentication apparatus for authenticating a user, comprising:

a memory storing a template face-picture of the user therein and a face-picture of a person of interest;

an image pickup unit taking a face-picture of said user;

a particular person comparing unit comparing said user's face-picture taken by said image pickup unit with the stored face-picture of a person of interest, wherein the stored face-picture of the user is different from the stored face-picture of the person of interest, outputting as comparison result a degree of similarity therebetween, and deciding whether said degree of similarity is higher than a predetermined value;

a personal picture acquiring unit for acquiring the stored template face-picture of the user from said memory; and an authentication unit, when said degree of similarity is higher than said predetermined value, determining whether or not said user's face-picture taken by the image pick-up unit is identical with the stored template face-picture of the user by a first method, and when said degree to similarity is lower than said predetermined value, determining whether or not said user's face picture taken by the image pick-up unit is identical with the stored template face picture of the user by a second method, the first method being different than the second method.

20. The apparatus claim 19, wherein the first method is stricter than the second method.

\* \* \* \* \*